F. JACOVIELLO.
DEVICE FOR PRODUCING HIGH FREQUENCY OSCILLATORY CURRENTS.
APPLICATION FILED MAR. 12, 1910.
1,004,170.
Patented Sept. 26, 1911.
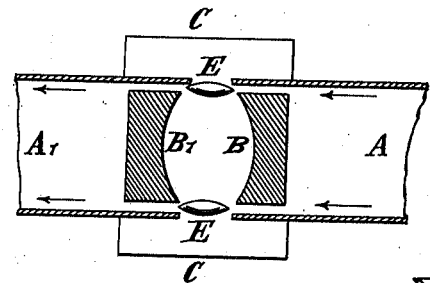
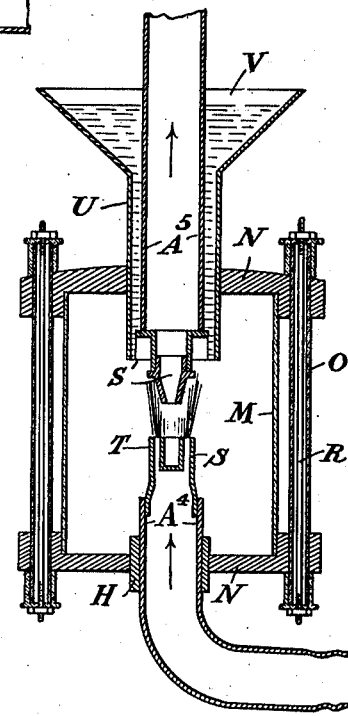
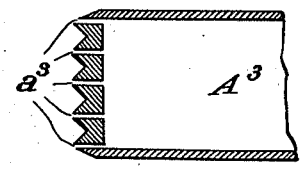
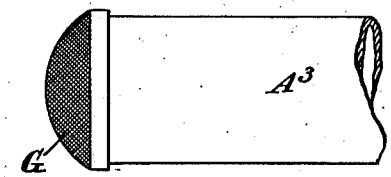
WITNESSES:
INVENTOR
FELICE JACOVIELLO,
by
Attorney.

UNITED STATES PATENT OFFICE.

FELICE JACOVIELLO, OF PARMA, ITALY.

DEVICE FOR PRODUCING HIGH-FREQUENCY OSCILLATORY CURRENTS.

1,004,170. Specification of Letters Patent. Patented Sept. 26, 1911.

Application filed March 12, 1910. Serial No. 549,028.

*To all whom it may concern:*

Be it known that I, FELICE JACOVIELLO, a subject of the King of Italy, residing at Parma, Italy, professor at the Royal University of Parma, Italy, have invented certain new and useful Improvements in Devices for Producing High-Frequency Oscillatory Currents, of which the following is a specification.

The object of the present invention is to provide a device for producing high frequency oscillatory currents, said device comprising means for producing a high potential electric arc into which a gas jet is sent in the same direction as the direction of the arc, the device also comprising means for obtaining the said gas jet, consisting in tubular electrodes the ends of which have small holes or ports through which the gas is discharged with more or less high speed.

My said device differs from similar known devices, such as Poulsen's, for instance, by the following features: 1. The difference of potential at the ends of the arc is comparatively high, so as to generate between them an electric field of about 10,000 volts for one centimeter: 2. For the magnet is substituted a gas jet, the gas of which moves in the same direction as the arc, or preferably the path of the gas molecules is approximately in the direction of the lines of force of the electric field.

In order that my said invention may be better understood, I have illustrated the same by some examples in the annexed drawing wherein:

Figure 1 is a central longitudinal sectional view of a form of the device adapted for average potential. Fig. 2 is a central longitudinal sectional view of an electrode for low potential. Fig. 3 is a similar view of an electrode for high potential. Fig. 3ª is a side elevation of another form of electrode for high potential, and Fig. 4 is a central vertical sectional view of a substantially complete device for average or low potential, and in which the electrodes are replaceable.

Referring to Fig. 1, A and A' designate two tubes with coinciding axes constituting the two electrodes of the arc, the opposing ends of the tubes being closed by circular pieces B and B' so as to leave two annular spaces between them and the tubes. The said two tubes are tightly fitted into a box C of a material resistant to high temperatures, and electrically insulated, at least in the perimetrical part. The opposed faces of the pieces B and B' are concaved in the case of the pieces being formed of conductive material. The tube A is cooled by the gas current itself, while the tube A', which carries the hot gases away, is advantageously cooled by still or circulating water. By compressing a gas in tube A and exhausting the same in tube A' an annular gas current in the direction of the arrow is generated between the two opposed ends of the tubes. By producing the spark between A and A' during the gas current, the arc will occupy the position E of the said current. In order to produce the electric waves the arc is put in the same conditions as the one used for producing high frequency currents. The simplest arrangement for wireless telegraphy will consist in connecting one electrode with an antenna, and the other with the ground. With small powers the box C may be dispensed with.

As shown in Fig. 2, the tubular electrodes $A^2$ may terminate in small holes $a^2$. The electric arc in this case is incorporated with the cylindric gas jet discharged from holes $a^2$ and terminating at the opposed electrode.

In the form of the invention shown in Fig. 3, the opposed ends of the tubular electrodes $A^3$ instead of terminating with annular ports may be provided with a plurality of holes and having metallic parts surrounding the holes in relief, and the other part concaved. The number of holes will depend from the potential of the arc. In order that the opposite ends of the electrodes may terminate with a great number of holes, pieces of very fine wire gauze G may be fitted thereto, or pieces similar to those used on the top of certain special Bunsen burners for causing the gas to pass a great number of holes and burn in a great number of small flames, as shown in Fig. 3ª. When dealing with very large arcs the said ends may terminate by a series of parallel ports, and the tube instead of cylindric may be of any other form. Fig. 3 shows a section of one of the said ends with five parallel ports $a^3$. A greater number of annular ports may also be used, though such an arrangement would present some difficulties.

In the form shown in Fig. 4, the tubes $A^4$ and $A^5$ are provided with modified electrodes S and S' so formed and placed as to be readily replaced as they become consumed, and so that they may be moved toward and away from each other in wireless telephony and telegraphy. In the said Fig. 4, M designates a sleeve of insulating material, holding spaced apart metallic disks N, N supporting the tubes $A^4$, $A^5$, the disks being held in place by rods R electrically insulated from the disks, by bushings O, if the disks are of metallic material. $A^4$ designates the tube through which the gas is discharged, and $A^5$ that through which the gas is exhausted. In order to form at the end of the electrode S the annular space through which the gas is discharged at high speed, a small tube T of metallic or insulating material is placed concentrically therein, said tube being closed at least at the end at which the gas is admitted. The electrode S' is in line with the electrode S and is open at its ends; and is kept loosely in place in the desired position in tube $A^5$ by three small spurs placed on the equidistant generatrixes of the cylinder. The gases on being discharged from the annular spaces of the electrode S meet with the electrode S' both outside and inside, and enter into tube $A^5$. The tube $A^5$ is surrounded by another tube U terminating at the top in a hopper V. The space between the tubes U and $A^5$ and even portion of the hopper is filled with water in order to cool the top of the apparatus. Both electrodes S and S' may be readily replaced, electrode S being kept in place by screws, while on the contrary the electrode S' is loosely held in place and prevented from being carried off by the gas jet by throttling the upper part of the tube.

Having now fully described my said invention and the manner in which the same is to be operated I declare that what I claim as my invention is:

1. A device for producing high frequency oscillatory currents, comprising opposed tubular electrodes through one of which gas is discharged in the form of a jet, and through the other of which the jet is exhausted, said electrodes being adapted to carry therebetween an arc in the same direction as the jet.

2. A device for producing high frequency oscillatory currents, comprising opposed tubular electrodes through one of which gas is discharged in the form of a jet, and through the other of which the jet is exhausted, said electrodes being adapted to carry therebetween an arc in the same direction as the jet, said electrodes being formed of conductive material and having their opposed ends formed with holes for the passage of the gas.

3. A device for producing high frequency oscillatory currents, comprising opposed tubular electrodes through one of which gas is discharged in the form of a jet, and through the other of which the jet is exhausted, said electrodes being adapted to carry therebetween an arc in the same direction as the jet, and sleeves of insulating material surrounding the arc and coaxial with the electrodes.

In testimony whereof I have affixed my signature in presence of two witnesses.

FELICE JACOVIELLO.

Witnesses:
DUILIO NARDONI,
W. H. BERRIGAN.